(12) United States Patent
Kulkarni

(10) Patent No.: US 11,903,345 B2
(45) Date of Patent: Feb. 20, 2024

(54) BALE EJECTION SYSTEM FOR A BALER IMPLEMENT

(71) Applicant: DEERE & COMPANY, Moline, IL (US)

(72) Inventor: Nikhil Kulkarni, Pune (IN)

(73) Assignee: DEERE & COMPANY, Moline, IL (US)

( * ) Notice: Subject to any disclaimer, the term of this patent is extended or adjusted under 35 U.S.C. 154(b) by 466 days.

(21) Appl. No.: 17/301,523

(22) Filed: Apr. 6, 2021

(65) Prior Publication Data

US 2022/0312679 A1 Oct. 6, 2022

(51) Int. Cl.
*A01F 15/08* (2006.01)

(52) U.S. Cl.
CPC .................. *A01F 15/0875* (2013.01)

(58) Field of Classification Search
CPC ...... A01F 15/0875; A01F 15/02; A01F 15/08; A01F 15/10
See application file for complete search history.

(56) References Cited

U.S. PATENT DOCUMENTS

| | | | | |
|---|---|---|---|---|
| 314,523 A * | 3/1885 | Duval | ............. | B30B 9/3014 |
| | | | | 100/218 |
| 491,201 A * | 2/1893 | Tarrant | ............. | B23Q 3/002 |
| | | | | 144/242.1 |
| 522,223 A * | 7/1894 | Luther | ............. | B65G 19/265 |
| | | | | 144/242.1 |
| 2,660,949 A * | 12/1953 | Russell | ............. | A01F 15/08 |
| | | | | 100/220 |
| 3,095,802 A * | 7/1963 | Nolt | ............. | A01F 15/08 |
| | | | | 100/19 R |
| 3,479,950 A * | 11/1969 | Freeman | ............. | B30B 9/3089 |
| | | | | 100/141 |
| 4,244,167 A * | 1/1981 | Seefeld | ............. | A01F 15/07 |
| | | | | 100/88 |

(Continued)

FOREIGN PATENT DOCUMENTS

| EP | 0264497 A1 * | 4/1988 | ......... A01F 15/0875 |
|---|---|---|---|
| EP | 3064055 A1 * | 9/2016 | ......... A01F 15/0875 |

(Continued)

OTHER PUBLICATIONS

Extended European Search Report and Written Opinion issued in European Patent Application No. 22166606.8, dated Aug. 17, 2022, in 08 pages.

*Primary Examiner* — Arpad F Kovacs

(57) ABSTRACT

A bale ejection system includes a pawl having a planar structure. The pawl includes a mounting bore extending therethrough. A center of the mounting bore defines a rotation axis. The planar structure of the pawl includes a cam surface and a material engaging surface disposed opposite the cam surface. The cam surface and the material engaging surface extend away from the rotation axis, and converge to define a distal end that is spaced from the rotation axis. The material engaging surface defines a crop engaging tooth positioned between the rotation axis and the distal end of the planar structure. The crop engaging tooth and the distal end of the planar structure are operable to engage crop material of a bale when the planar structure is rotated into engagement with the bale for moving the bale along a longitudinal axis of a baler implement.

18 Claims, 4 Drawing Sheets

(56) References Cited

U.S. PATENT DOCUMENTS

| | | | |
|---|---|---|---|
| 5,540,144 A * | 7/1996 | Schrag | A01F 15/0875 |
| | | | 100/188 R |
| 7,093,537 B2 | 8/2006 | Dubois | |
| 8,915,182 B2 * | 12/2014 | Van Groenigen | A01F 15/145 |
| | | | 100/188 R |
| 9,038,532 B2 | 5/2015 | Naeyaert | |
| 9,185,846 B2 * | 11/2015 | Dumarey | B30B 9/3014 |
| 9,226,451 B2 * | 1/2016 | Boone | A01F 15/0825 |
| 10,945,377 B2 * | 3/2021 | Roth | B30B 9/3025 |
| 2009/0249968 A1 * | 10/2009 | De Rycke | A01F 15/0875 |
| | | | 100/188 R |
| 2013/0233187 A1 * | 9/2013 | De Rycke | B30B 9/3014 |
| | | | 100/188 R |
| 2013/0255512 A1 * | 10/2013 | Naeyaert | A01F 15/0825 |
| | | | 100/191 |
| 2015/0305245 A1 | 10/2015 | Denson | |
| 2018/0192591 A1 * | 7/2018 | Monbaliu | A01F 15/0825 |

FOREIGN PATENT DOCUMENTS

| | | | |
|---|---|---|---|
| EP | 2947978 B1 * | 5/2019 | A01F 15/0825 |
| GB | 2034244 A * | 6/1980 | A01F 15/08 |
| WO | WO9405528 A1 | 3/1994 | |

\* cited by examiner

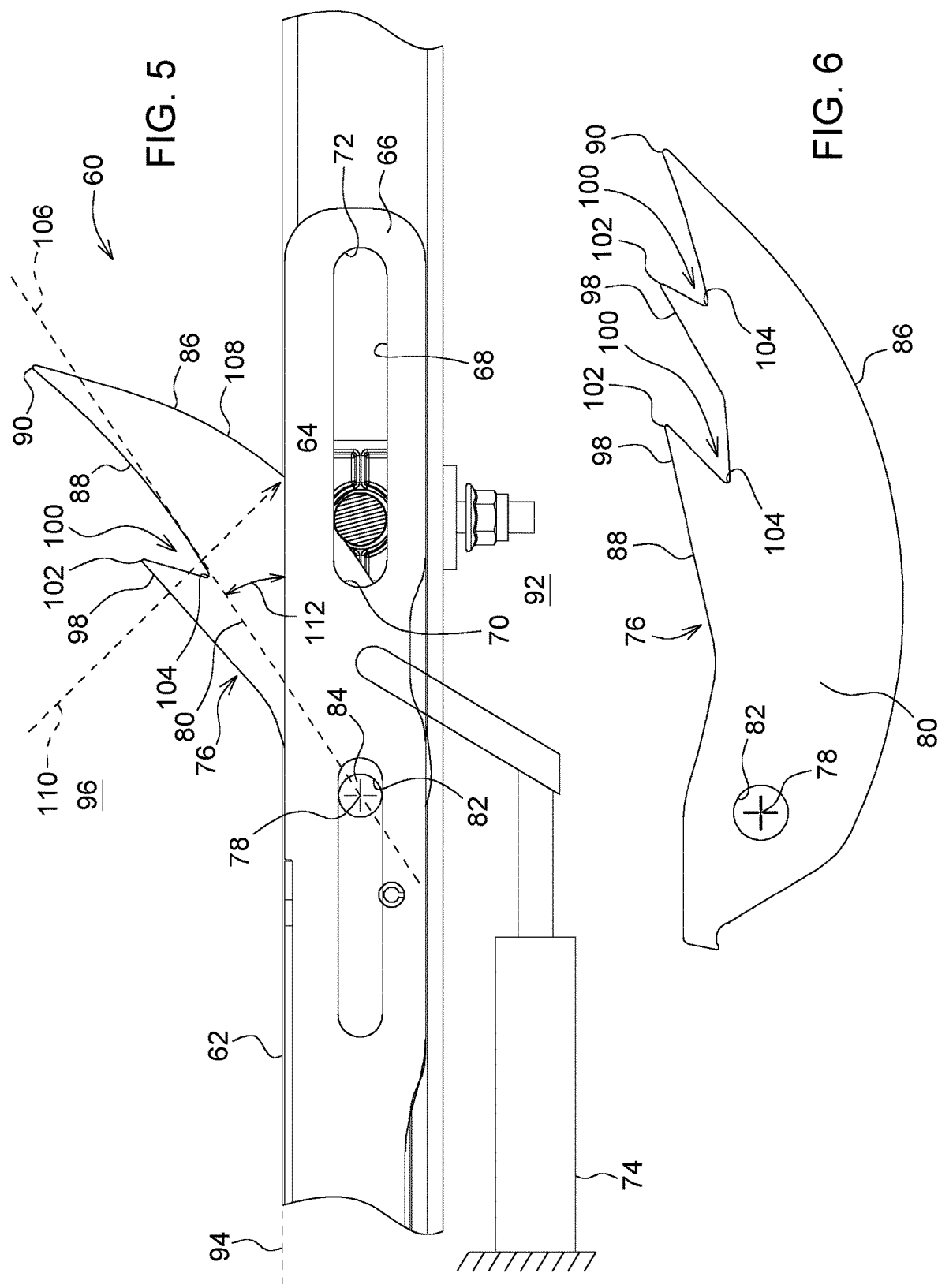

BALE EJECTION SYSTEM FOR A BALER IMPLEMENT

TECHNICAL FIELD

The disclosure generally relates to a baler implement having a bale ejection system.

BACKGROUND

Some baler implements, such as a large square baler, produce a bale in a compression chamber having a parallelepiped shape. As the bale is formed, the bale is moved from the compression chamber onto a discharge chute. Subsequently produced bales push the previously formed bale out of the discharge chute to eject the previously formed bale from the baler implement, and onto a ground surface, trailer, wrapping implement, etc. However, if no subsequent bale is formed, then the last bale is not ejected from the discharge chute.

In order to eject the last bale formed, the baler implement may include a bale ejection system. The bale ejection system may include a pawl that is wedged into the bale to engage the bale when moved longitudinally rearward, and is retracted to disengage from the bale when moved longitudinally forward. The bale ejection system may be continuously operated in a cyclical manner to move the bale rearward until the bale is discharged from the bale chute.

SUMMARY

A bale ejection system for a baler implement is provided. The bale ejection system includes a frame, and a pin secured to the frame. A carrier is coupled to the frame. The carrier is moveable relative to the frame along a longitudinal axis of the frame. The carrier defines an elongated slot that extends along the longitudinal axis of the frame. The pin extends through the elongated slot, transverse to the longitudinal axis. A pawl is moveable with the carrier along the longitudinal axis. The pawl is rotatably attached to the carrier for rotation bout a rotation axis. The pawl includes a cam surface contacting the pin. The pawl further includes a material engaging surface that is disposed opposite the cam surface. The cam surface and the material engaging surface extend away from the rotation axis and converging to define a distal end of the pawl that is spaced from the rotation axis along the longitudinal axis. The material engaging surface defines a crop engaging tooth that is positioned between the rotation axis and the distal end of the pawl along the longitudinal axis.

In one implementation, the crop engaging tooth includes a single tooth disposed between the rotation axis and the distal end of the pawl. In an alternative implementation, the crop engaging tooth includes a plurality of teeth disposed between the rotation axis and the distal end of the pawl.

In one aspect of the disclosure, the crop engaging tooth forms a concave notch facing away from the rotation axis for engaging crop material of a formed bale. The concave notch includes a crest and a valley. When the pawl is disposed in a retracted position, the crest is positioned nearer the distal end of the pawl than the valley, with the valley positioned nearer the rotation axis than the crest.

In one aspect of the disclosure, the cam surface may include a substantially arcuate profile orientated perpendicularly to the rotation axis. In one implementation, the arcuate profile of the cam surface may define a radius between the range of 150 mm and 210 mm.

In one aspect of the disclosure, movement of the carrier and the pawl along the longitudinal axis moves the cam surface against the pin, causing the pawl to rotate about the rotation axis between a retracted position and an engaged position. When the pawl is disposed in the retracted position, the pawl is positioned on an exterior side of a bale forming plane. The bale forming plane is a surface defined by a wall structure supporting the bale. The bale is positioned on an interior side of the bale forming plane. When the pawl is disposed in the engaged position, the pawl extends across the bale forming plane to position the distal end of the pawl and the crop engaging tooth on the interior side of the bale forming plane for engaging crop material of the formed bale.

In one aspect of the disclosure, the cam profile may be shaped to position the pawl relative to the bale forming plane when the pawl is disposed in the engaged position, such that a line extending between the distal end of the pawl and the rotation axis intersects the bale forming plane to form an acute angle therebetween. In one implementation, the acute angle is greater than twenty degrees (20°).

In one aspect of the disclosure, the cam profile may be shaped to cause a total angular rotation of the pawl about the rotation axis. The total angular rotation is measured between the retracted position and the engaged position. In one implementation, the total angular rotation is between 25 degrees and 45 degrees.

In one aspect of the disclosure, the rotation axis is perpendicular to the longitudinal axis. In another aspect of the disclosure, the rotation axis and the longitudinal axis are both positioned substantially horizontally.

In one aspect of the disclosure, the bale ejection system is included in a baler implement. The baler implement includes the frame extending along the longitudinal axis, between a forward end and a rearward end of the frame relative to a direction of travel of the baler implement during harvesting operations. The baler implement includes a compression chamber that is configured for forming crop material into the bale. The bale ejection system is operable to move the bale rearward along the longitudinal axis.

A pawl for a bale ejection system of a baler implement is also provided. The pawl includes a planar structure. The planar structure includes a mounting bore extending therethrough. A center of the mounting bore defines a rotation axis. The planar structure includes a cam surface and a material engaging surface disposed opposite the cam surface. The cam surface and the material engaging surface extend away from the rotation axis, and converge to define a distal end that is spaced from the rotation axis. The material engaging surface defines a crop engaging tooth positioned between the rotation axis and the distal end of the planar structure. The crop engaging tooth and the distal end of the planar structure are operable to engage crop material of a bale when the planar structure is rotated into engagement with the bale.

Accordingly, both the distal end of the pawl and the crop engaging tooth operate to engage and/or interlock with the crop material of the bale when the pawl is moved into the engaged position. As such, the pawl described herein, including the crop engaging tooth, grips the bale better than previously known pawls that only gripped the bale with the distal end of the pawl. The increased grip provided by the pawl described herein, including the crop engaging tooth, increase the force that the pawl may apply to the bale for moving the bale, thereby reducing crop rip-out.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 5 is a schematic side view of a pawl of the bale ejection system.

FIG. 6 is a schematic side view of an alternative implementation of the pawl.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
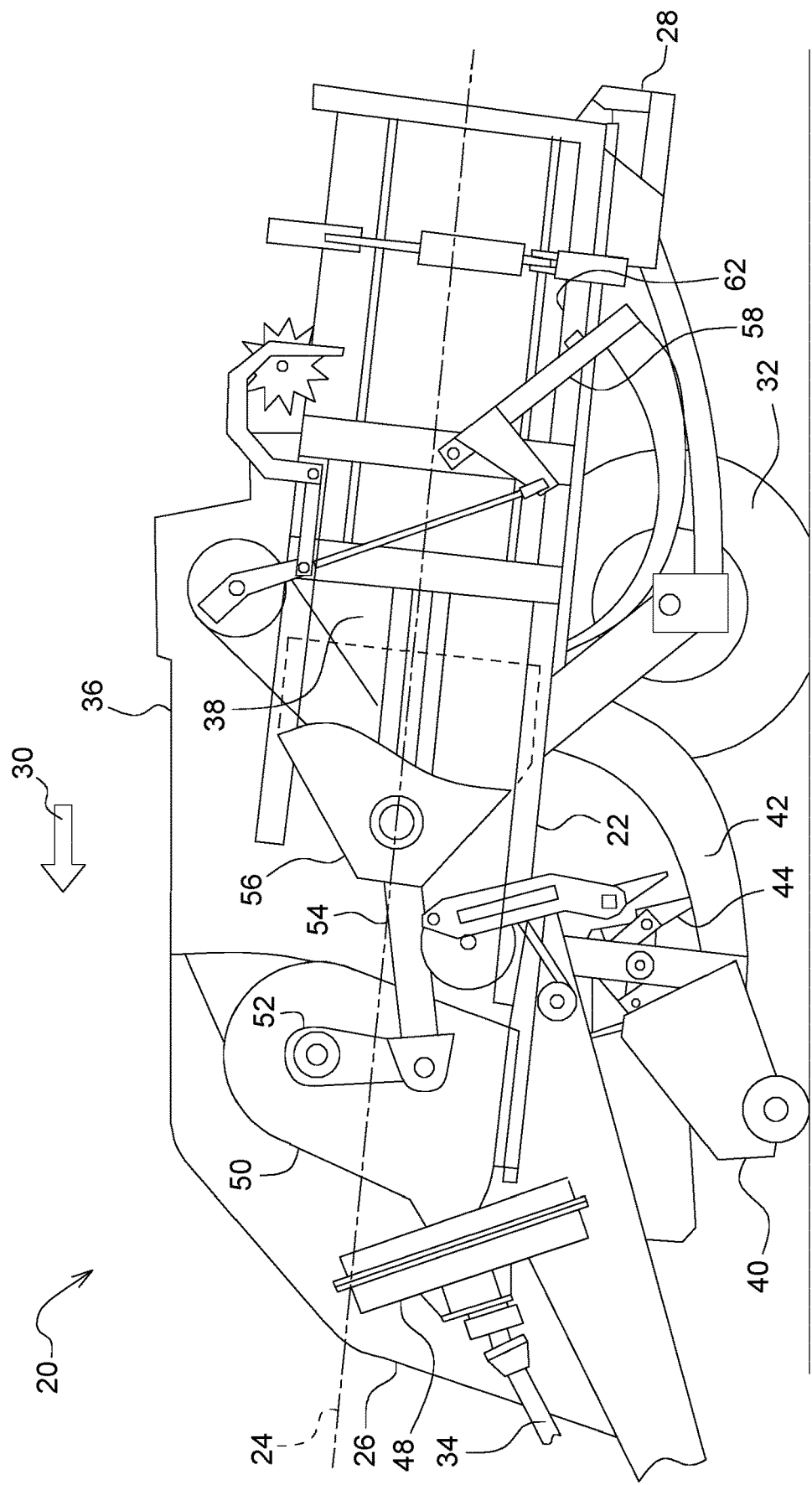
FIG. 1 is a schematic side view of a baler implement.

Referring to the Figures, wherein like numerals indicate like parts throughout the several views, a baler implement is generally shown at 20. Referring to FIG. 1 the baler implement 20 is shown as a large square baler implement 20. However, it should be appreciated that the teachings of this disclosure may be applied to other baler implement platforms, such as round baler implements, and are not limited to the example implementation of the large square baler implement 20 shown in the Figures and described herein.

A traction unit or vehicle, such as but not limited to a tractor, may be coupled to the baler implement 20 for pulling and powering the baler implement 20. However, it should be appreciated that in other embodiments, the baler implement 20 may be self-propelled, in which case the traction unit and the baler implement 20 are configured as a single, self-propelled vehicle.

As depicted in FIG. 1, the baler implement 20 may move across a field and gather and process crop material to form a bale. The baler implement 20 may then eject the formed bale from the rear of the baler implement 20.

Referring to FIG. 1, the exemplary embodiment of the baler implement 20 includes a frame 22. The frame 22 extends along a longitudinal axis 24 between a forward end 26 and a rearward end 28 relative to a direction of travel 30 of the baler implement 20 during operation. One or more ground engaging devices 32, such as but not limited to wheels, are coupled to the frame 22 and support the baler implement 20 on a ground surface. The baler implement 20 includes an input shaft 34, such as a power-take-off (PTO) shaft, which can receive rotational power from a power source, such as the tractor.

The baler implement 20 includes a housing 36 or body, which generally shields various internal components of the baler implement 20. The housing 36 is attached to and supported by the frame 22. The housing 36 includes multiple wall sections or panels that form and/or define a compression chamber 38. The compression chamber 38 may alternatively be referred to as a baler chamber. The compression chamber 38 is configured to form a bale therein. In the example implementation shown in the Figures and described herein, the bale includes a parallelepiped or rectangular shape.

The baler implement 20 includes a pick-up mechanism 40. The pick-up mechanism 40 is disposed proximate the forward end 26 of the frame 22. The pick-up mechanism 40 gathers crop material from the ground surface and directs the gathered crop material toward and into an inlet of a pre-compression passageway 42, which stores a volume of gathered crop material. A feeder system 44 includes a plurality of forks, which are timed to move the crop material from the pre-compression passageway 42 into the compression chamber 38. The pickup may include, but is not limited to tines, forks, augers, conveyors, baffles, etc., for gathering and moving the crop material.

The baler implement 20 may be equipped with a pre-cutter, disposed between the pick-up mechanism 40 and the pre-compression passageway 42. As such, the pre-cutter may be disposed downstream of the pick-up mechanism 40 and upstream of the pre-compression passageway 42 relative to the direction of travel 30 of the crop material. The pre-cutter cuts or chops the crop material into smaller pieces.

The input shaft 34 or PTO shaft is connected to an input of a transmission 48 to provide rotational power to the baler implement 20 from the tractor or other associated vehicle or power source. The transmission 48 includes a gearbox 50 which converts the rotational motion of the input shaft 34 along a generally longitudinal axis 24 of the baler implement 20 to an output of the transmission 48 having a rotational motion along a generally transverse axis of the baler implement 20.

The baler implement 20 includes a crank arm 52 connected to the output of the transmission 48. A connecting link 54 interconnects the crank arm 52 and a plunger 56. The crank arm 52 rotates based upon the output of the transmission 48 and the plunger 56 moves in a reciprocal motion within the compression chamber 38 as the crank arm 52 rotates. The plunger 56 extends into the compression chamber 38, thereby compressing the crop material, and then at least partially retracts from the compression chamber 38, at which time the feeder system 44 moves more crop material into the compression chamber 38.

When the bale is completed within the compression chamber 38, a knotter system 58 wraps a plurality of twine strands around the bale to secure the shape of the bale. When the baler implement 20 is configured as the large square baler, such as described herein, the knotter system 58 wraps the twine around a longitudinal extent or longest length of the bale, with each individual twine strand encircling the bale. The knotter system 58 ties each end of the twine of each respective twine strand together to form a knot, securing each respective twine strand in place.

In the example implementation shown in the figures and described herein, a completed bale is pushed off a rearward end 28 of the baler implement 20 by a subsequently formed bale, onto a ground surface, trader, etc. In order to discharge a bale that is the last bale of a harvesting period, or in order to discharge a bale when no subsequent bales are available to push the bale off the rearward end 28 of the baler implement 20, the baler implement 20 may be equipped with a bale ejection system 60. The bale ejection system 60 may be engaged to move the bale rearward along the longitudinal axis 24 and discharge the bale from the compression chamber 38.

Figure 2:
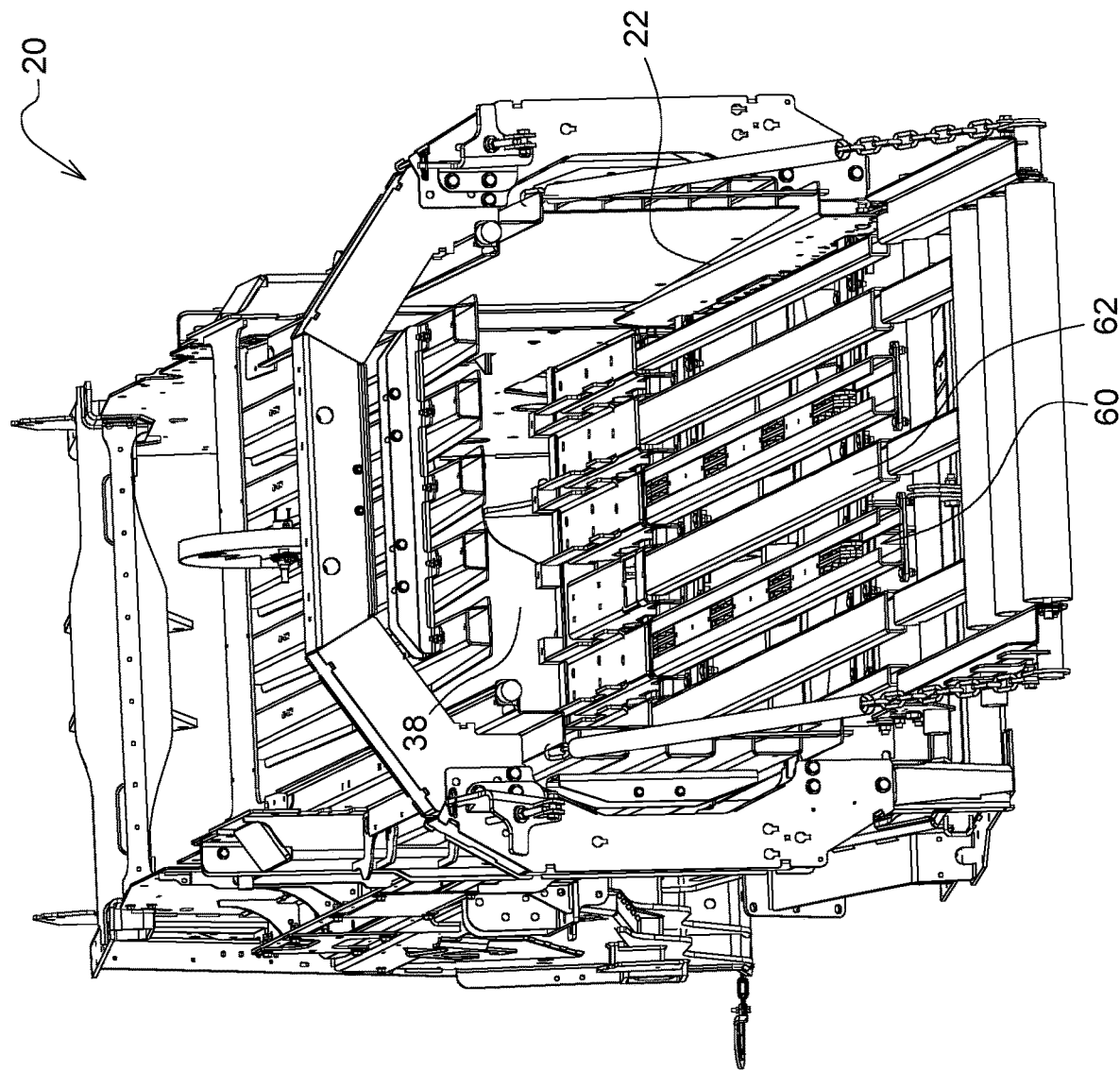
FIG. 2 is a schematic partial perspective view of the baler implement, showing a bale ejection system.

Referring to FIG. 2, the bale ejection system 60 is shown incorporated into a bottom wall 62 of the compression chamber 38. However, it should be appreciated that in other implementations, the bale ejection system 60 may be incorporated into additional or other wall panels of the compression chamber 38.

A pin 64 is secured to the frame 22. The pin 64 extends generally transverse or perpendicular to the longitudinal axis 24 of the frame 22. The pin 64 may be attached to the frame 22 directly or indirectly, and remains stationary relative to the frame 22. In the implementation shown in the Figures, the pin 64 is shown having a circular cross section perpendicular to the longitudinal axis 24. However, it should be appreciated that the pin 64 may have a cross sectional shape that differs from the example circular cross sectional shape shown and described herein.

A carrier 66 is coupled to the frame 22. The carrier 66 is moveable relative to the frame 22 along the longitudinal axis 24 of the frame 22. The carrier 66 may be moveably coupled to the frame 22 in a suitable manner the enables longitudinal movement relative to the frame 22. For example, the carrier 66 may be slidably mounted to the frame 22. The carrier 66 defines an elongated slot 68 that extends along the longitudinal axis 24 of the frame 22. The pin 64 extends through the elongated slot 68. The carrier 66 is moveable relative to the pin 64, such that the pin 64 may move within the elongated slot 68 between a first end 70 of the slot and a second end 72 of the slot. The first end 70 of the slot is located toward the forward end 26 of the frame 22, whereas the second end 72 of the slot is located toward the rearward end 28 of the frame 22.

The bale ejection system 60 may further include an actuator 74. The actuator 74 may interconnect the frame 22 and the carrier 66. The actuator 74 may be controllable to extend and retract to move the carrier 66 relative to the frame 22 along the longitudinal axis 24 of the frame 22. The actuator 74 may include, but is not limited to, a hydraulic linear actuator 74, a pneumatic linear actuator 74, an electric linear actuator 74, etc. Additionally, the actuator 74 may include a linear or non-linear actuator 74 that is coupled to one or more gears and/or levers to effectuate linear movement of the carrier 66 along the longitudinal axis 24, such as but not limited to an electric motor, a hydraulic motor, etc.

A pawl 76 is attached to and moveable with the carrier 66 along the longitudinal axis 24 and relative to the frame 22. The pawl 76 is rotatably attached to the carrier 66 for rotation bout a rotation axis 78. The rotation axis 78 is generally perpendicular to the longitudinal axis 24. As shown in the example implementation described herein, in which the bale ejection system 60 is incorporated into the bottom wall 62 of the compression chamber 38, the rotation axis 78 is positioned horizontally relative to the ground surface. However, it should be appreciated that in other implementations, such as if the bale ejection system 60 were incorporated into a side wall of the compression chamber 38, the rotation axis 78 may be positioned vertically relative to the ground surface.

In the example implementation shown in the Figures and described herein, the pawl 76 includes a planar or plate structure 80. The planar structure 80 of the pawl 76 includes a mounting bore 82 that extends through the planar structure 80. The mounting bore 82 is parallel with the rotation axis 78. A fastener 84, such as but not limited to a bolt, shaft, rivet, etc., may extend through they mounting bore 82 and secure the pawl 76 to the carrier 66. A center of the mounting bore 82 defines the rotation axis 78.

The pawl 76 includes a cam surface 86 disposed in contacting or abutting engagement with the pin 64. The pawl 76 further includes a material engaging surface 88 disposed opposite the cam surface 86. The material engaging surface 88 is a surface of the pawl 76 that engages a material. The material may include, but is not limited to, a plant material, a crop material, or a bale of plant and/or crop material. In the example implementation shown in the figures and described herein, both the cam surface 86 and the material engaging surface 88 may be considered edge surfaces of the planar structure 80 of the pawl 76. The cam surface 86 and the material engaging surface 88 extend away from the rotation axis 78 and converge to define a distal end 90 of the planar structure 80 of the pawl 76. The cam surface 86 and the material engaging surface 88 terminate at the distal end 90 of the planar structure 80 of the pawl 76. The distal end 90 of the pawl 76 is spaced from the rotation axis 78 along the longitudinal axis 24.

Movement of the carrier 66 and the pawl 76 along the longitudinal axis 24 moves the cam surface 86 against the pin 64. Movement along the longitudinal axis 24 of the cam surface 86 on the pin 64 causes the pawl 76 to rotate about the rotation axis 78 between a retracted position, show in FIG. 3, and an engaged position, shown in FIG. 4. When disposed in the retracted position, the pawl 76 is positioned on an exterior side 92 of a bale forming plane 94. The bale forming plane 94 may be considered a plane defined by a wall surface forming the compression chamber 38, e.g., the bottom wall 62 in the example implementation shown in the Figures and described herein. The bale is formed on an interior side 96 of the bale forming plane 94. As such, the exterior side 92 of the bale forming plane 94 is positioned outside the region or volume of the compression chamber 38 in which the bale is formed, i.e., exterior to the bale, whereas the interior side 96 of the bale forming plane 94 is positioned inside the region or volume of the compression chamber 38 that forms the bale.

Figure 3:
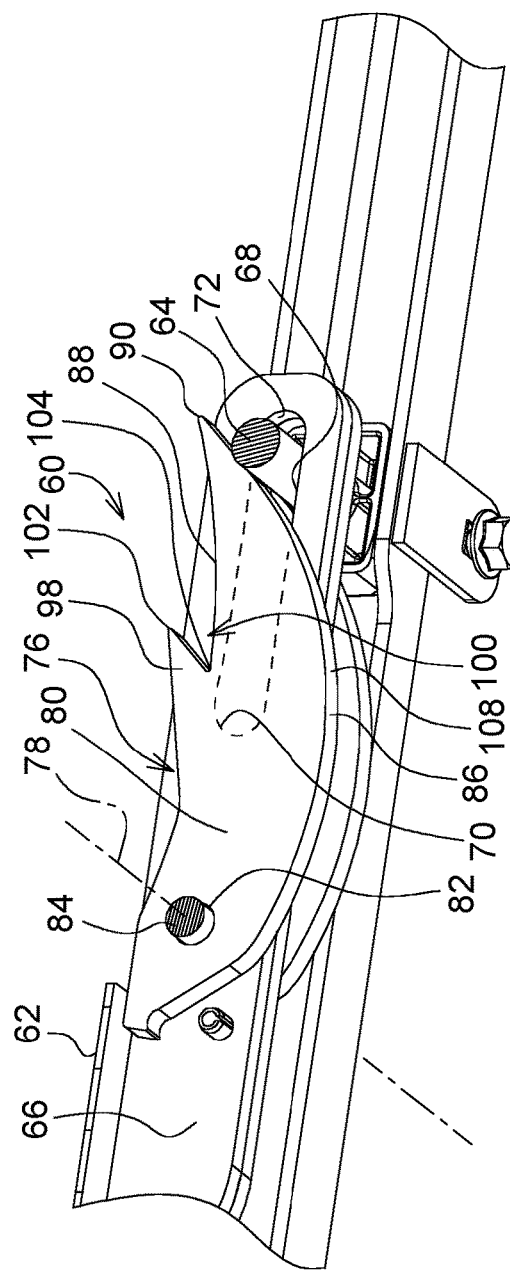
FIG. 3 is a schematic perspective view of the bale ejection system in a retracted position.
Figure 4:
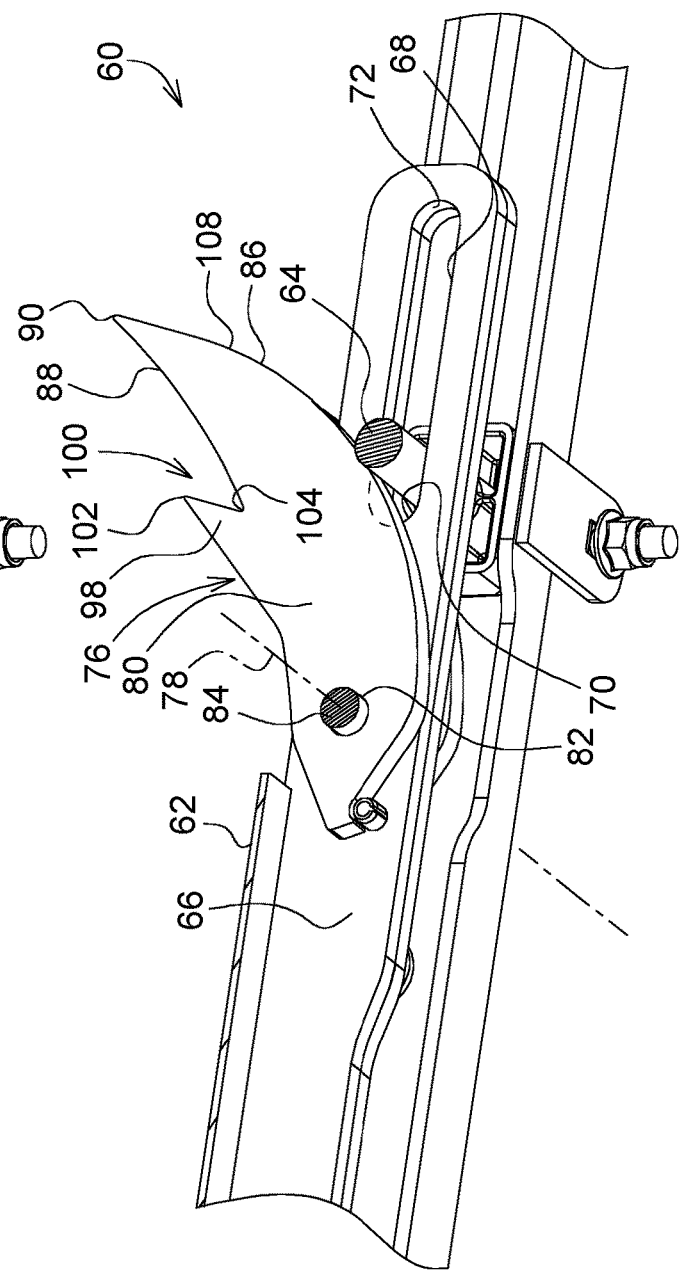
FIG. 4 is a schematic perspective view of the bale ejection system in an engaged position.

Initial movement of the carrier 66 and the pawl 76 in a rearward direction moves the pawl 76 from the retracted position, shown in FIG. 3, into the engaged position, shown in FIG. 4. It should be appreciated that the rearward direction is a direction moving toward the rearward end 28 of the frame 22. When the pawl 76 is positioned in the engaged position, the pawl 76 extends across the bale forming plane 94 to position the distal end 90 of the pawl 76 on the interior side 96 of the bale forming plane 94 for engaging crop material of the formed bale and moving the bale with the pawl 76 and the carrier 66. Once the pawl 76 is disposed in the engaged position, continued movement of the carrier 66 rearward along the longitudinal axis 24, maintains engagement between the pawl 76 and the bale and moves the bale rearward relative to the compression chamber 38 to discharge the bale.

Initial movement of the carrier 66 and the pawl 76 in a forward direction along the longitudinal axis 24, causes the pawl 76 to rotate and move the engaged position, shown in FIG. 4, into the retracted position, shown in FIG. 3. It should be appreciated that the forward direction is a direction moving toward the forward end 26 of the frame 22. When the pawl 76 is disposed in the retracted position, the distal end 90 of the pawl 76 is positioned on the exterior side 92 of the bale forming plane 94 and does not engage the bale. Once the pawl 76 is disposed in the retracted position, continued movement of the carrier 66 forward along the longitudinal axis 24, maintains dis-engagement between the pawl 76 and the bale and moves the carrier 66 and the pawl 76 relative to the compression chamber 38 to reset the carrier 66 and the pawl 76 for a subsequent ejection stroke.

In order to improve mechanical interaction and/or engagement between the pawl 76 and the crop material of the bale, the material engaging surface 88 defines a crop engaging tooth 98. The crop engaging tooth 98 may include, but is not limited to, a pointed edge, spike, spear, barb, etc. for penetrating into the bale and mechanically interlocking with the crop material of the bale. The crop engaging tooth 98 is positioned on the material engaging surface 88, between the rotation axis 78 and the distal end 90 of the pawl 76 along the longitudinal axis 24. Similar to the distal end 90 of the pawl 76, the crop engaging tooth 98 is positioned on the interior side 96 of the bale forming plane 94 when pawl 76 is disposed in the engaged position, and is positioned on the exterior side 92 of the bale forming plane 94 when the pawl 76 is disposed in the retracted position.

In one implementation, the crop engaging tooth 98 includes a single tooth. However, in other implementations, such as shown in FIG. 6, the crop engaging tooth 98 may include plurality of teeth 98. For example, the pawl 76 may include, two crop engaging teeth 98, three crop engaging teeth 98, four crop engaging teeth 98, etc. As such, it should be appreciated that the crop engaging tooth 98 may include one crop engaging tooth 98, such as shown in FIG. 5, or may include a plurality of crop engaging teeth 98, such as shown in FIG. 6. Furthermore, it should be appreciated that the crop engaging tooth 98 is distinct and separate from the distal end 90 of the pawl 76. While the distal end 90 of the pawl 76 engages the crop material of the bale, the crop engaging tooth 98 operates in addition to the distal end 90 of the pawl 76 to provide increased engagement/interaction between the pawl 76 and the bale. The increased engagement and/or interaction between the pawl 76 and the bale increases a moving force that the pawl 76 may apply to the bale for moving the bale, thereby reducing the chance that crop material may be torn from the bale and/or the bale may be otherwise damaged during the ejection operation.

Referring to FIG. 5, the crop engaging tooth 98 forms a concave notch 100 facing away from the rotation axis 78 for engaging crop material of the formed bale. The concave notch 100 includes a crest 102 and a valley 104. When the pawl 76 is disposed in the retracted position, the crest 102 is positioned nearer the distal end 90 of the pawl 76 than the valley 104. In contrast, when the pawl 76 is disposed in the retracted position, the valley 104 is positioned nearer the rotation axis 78 than the crest 102. A reference line 106 may extend between the rotation axis 78 and the distal end 90 of the planar structure 80 of the pawl 76. The crest 102 of the crop engaging tooth 98 is positioned farther from the reference line 106 than is the valley 104.

The cam surface 86 may be configured to position the distal end 90 of the pawl 76 and the crop engaging tooth 98 deeply into the bale to maximize the mechanical interaction or locking that occurs between the pawl 76 and the crop material of the bale.

Referring to FIG. 5, the pawl 76 is shown in the engaged position using solid lines, and is shown in the retracted position in phantom. The cam surface 86 may include a substantially arcuate profile 108 orientated perpendicularly to the rotation axis 78. In the example implementation shown in the Figures and described herein the arcuate profile 108 of the cam surface 86 may define a radius 110 between the range of 150 mm and 210 mm. It should be appreciated that the radius 110 of the arcuate profile 108 may differ from the example implementation shown in the Figures and described herein. It should be appreciated that a shorter radius 110 of the arcuate profile 108 tends to increase penetration of the distal end 90 of the pawl 76 into the bale. In order to generate good mechanical interaction between the bale and the crop engaging tooth 98, the pawl 76 may be rotated about the rotation axis 78 farther than if only the distal end 90 of the pawl 76 is used to engage the bale.

Referring to FIG. 5, when the pawl 76 is disposed in the engaged position, the cam profile is shaped to position the pawl 76 relative to the bale forming plane 94 such that the reference line 106 extending between the distal end 90 of the pawl 76 and the rotation axis 78 intersects the bale forming plane 94 to form an acute angle 112 therebetween. In order to position the distal end 90 of the pawl 76 and the crop engaging tooth 98 on the material engaging surface 88 deeply into the bale to maximize the mechanical interaction or locking that occurs between the pawl 76 and the crop material of the bale, the acute angle 112 may be greater than twenty degrees (20°). Additionally, in order to achieve the acute angle 112 described above, the cam profile may be shaped to cause a total angular rotation of the pawl 76 about the rotation axis 78 that is between 25 degrees and 45 degrees. The total angular rotation of the pawl 76 is the total angular movement of the pawl 76 when moving between the engaged position and the retracted position.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:
1. A bale ejection system for a baler implement, the bale ejection system comprising:
   a frame;
   a pin secured to the frame;
   a carrier coupled to the frame and moveable relative to the frame along a longitudinal axis of the frame, wherein the carrier defines an elongated slot extending along the longitudinal axis of the frame with the pin extending through the elongated slot;

a pawl moveable with the carrier along the longitudinal axis and rotatably attached to the carrier for rotation about a rotation axis;

wherein the pawl includes a cam surface contacting the pin, and a material engaging surface disposed opposite the cam surface, with the cam surface and the material engaging surface terminating at a distal end of the pawl that is spaced from the rotation axis along the longitudinal axis; and wherein the material engaging surface defines a crop engaging tooth positioned between the rotation axis and the distal end of the pawl along the longitudinal axis.

2. The bale ejection system set forth in claim 1, wherein the crop engaging tooth includes a plurality of teeth.

3. The bale ejection system set forth in claim 1, wherein the crop engaging tooth forms a concave notch facing away from the rotation axis for engaging crop material of a formed bale.

4. The bale ejection system set forth in claim 3, wherein the concave notch includes a crest and a valley, with the crest positioned nearer the distal end of the pawl than the valley when the pawl is disposed in a retracted position, and with the valley positioned nearer the rotation axis than the crest when the pawl is disposed in the retracted position.

5. The bale ejection system set forth in claim 1, wherein the cam surface includes a substantially arcuate profile orientated perpendicularly to the rotation axis.

6. The bale ejection system set forth in claim 5, wherein the arcuate profile of the cam surface defines a radius between the range of 150 mm and 210 mm.

7. The bale ejection system set forth in claim 1, wherein movement of the carrier and the pawl along the longitudinal axis moves the cam surface against the pin causing the pawl to rotate about the rotation axis between a retracted position in which the pawl is positioned on an exterior side of a bale forming plane, and an engaged position in which the pawl extends across the bale forming plane to position the distal end of the pawl and the crop engaging tooth on an interior side of the bale forming plane for engaging crop material of a formed bale.

8. The bale ejection system set forth in claim 7, wherein the cam profile is shaped to position the pawl relative to the bale forming plane when the pawl is disposed in the engaged position such that a line extending between the distal end of the pawl and the rotation axis intersects the bale forming plane to form an acute angle therebetween, wherein the acute angle is greater than twenty degrees.

9. The bale ejection system set forth in claim 7, wherein the cam profile is shaped to cause a total angular rotation of the pawl about the rotation axis that is between 25 degrees and 45 degrees.

10. The bale ejection system set forth in claim 1, wherein the rotation axis is perpendicular to the longitudinal axis, and wherein the rotation axis and the longitudinal axis are positioned substantially horizontally.

11. A baler implement comprising:

a frame extending along a longitudinal axis between a forward end and a rearward end;

a compression chamber configured for forming crop material into a bale;

a bale ejection system operable to move a bale rearward along the longitudinal axis, the bale ejection system including:

a pin secured to the frame;

a carrier coupled to the frame and moveable relative to the frame along a longitudinal axis of the frame, wherein the carrier defines an elongated slot extending along the longitudinal axis of the frame with the pin extending through the elongated slot;

a pawl moveable with the carrier along the longitudinal axis and rotatably attached to the carrier for rotation about a rotation axis;

wherein the pawl includes a cam surface contacting the pin, and a material engaging surface disposed opposite the cam surface, with the cam surface and the material engaging surface extending away from the rotation axis and converging to define a distal end of the pawl that is spaced from the rotation axis along the longitudinal axis; and wherein the material engaging surface defines a crop engaging tooth positioned between the rotation axis and the distal end of the pawl along the longitudinal axis.

12. The baler implement set forth in claim 11, wherein the crop engaging tooth forms a concave notch facing away from the rotation axis for engaging crop material of a formed bale.

13. The baler implement set forth in claim 12, wherein the concave notch includes a crest and a valley, with the crest positioned nearer the distal end of the pawl than the valley when the pawl is disposed in a retracted position, and with the valley positioned nearer the rotation axis than the crest when the pawl is disposed in the retracted position.

14. The baler implement set forth in claim 11, wherein the cam surface includes a substantially arcuate profile orientated perpendicularly to the rotation axis.

15. The baler implement set forth in claim 14, wherein the arcuate profile of the cam surface defines a radius between the range of 150 mm and 210 mm.

16. The baler implement set forth in claim 11, wherein movement of the carrier and the pawl along the longitudinal axis moves the cam surface against the pin causing the pawl to rotate about the rotation axis between a retracted position in which the pawl is positioned on an exterior side of a bale forming plane, and an engaged position in which the pawl extends across the bale forming plane to position the distal end of the pawl and the crop engaging tooth on an interior side of the bale forming plane for engaging crop material of a formed bale.

17. The baler implement set forth in claim 16, wherein the cam profile is shaped to position the pawl relative to the bale forming plane when the pawl is disposed in the engaged position such that a line extending between the distal end of the pawl and the rotation axis intersects the bale forming plane to form an acute angle therebetween, wherein the acute angle is greater than twenty degrees.

18. The baler implement set forth in claim 17, wherein the cam profile is shaped to cause a total angular rotation of the pawl about the rotation axis that is between 25 degrees and 45 degrees.

* * * * *